(12) United States Patent
Conover et al.

(10) Patent No.: US 9,933,832 B2
(45) Date of Patent: Apr. 3, 2018

(54) SYSTEMS AND METHODS FOR MODIFYING POWER STATES IN A VIRTUAL ENVIRONMENT

(71) Applicant: CloudVolumes, Inc., Palo Alto, CA (US)

(72) Inventors: Matthew Conover, Mountain View, CA (US); Rajesh H. Parekh, Los Altos, CA (US)

(73) Assignee: VMWARE, INC., Palo Alto, CA (US)

( * ) Notice: Subject to any disclaimer, the term of this patent is extended or adjusted under 35 U.S.C. 154(b) by 492 days.

(21) Appl. No.: 13/828,144

(22) Filed: Mar. 14, 2013

(65) Prior Publication Data

US 2014/0281619 A1    Sep. 18, 2014

(51) Int. Cl.
*G06F 1/32* (2006.01)

(52) U.S. Cl.
CPC .......... *G06F 1/3234* (2013.01); *G06F 1/3206* (2013.01); *G06F 1/3228* (2013.01); *G06F 1/3287* (2013.01); *Y02B 60/1282* (2013.01)

(58) Field of Classification Search
CPC ................. G06F 1/32; G06F 1/26; G06F 1/28
USPC ..... 713/300, 310, 320, 3, 21, 322, 323, 324, 713/330, 340, 375
See application file for complete search history.

(56) References Cited

U.S. PATENT DOCUMENTS

| | | | | |
|---|---|---|---|---|
| 8,065,676 B1 * | 11/2011 | Sahai | ................... | G06F 9/5077 709/226 |
| 8,612,596 B1 * | 12/2013 | Li | ..................... | G06Q 30/0202 705/5 |
| 2009/0019202 A1 * | 1/2009 | Shetty | ................... | G06F 1/26 710/116 |
| 2009/0106409 A1 * | 4/2009 | Murata | .................. | G06F 9/5077 709/223 |
| 2009/0106571 A1 * | 4/2009 | Low | ...................... | G06F 9/4856 713/310 |
| 2009/0150896 A1 * | 6/2009 | Tsushima et al. | ............ | 718/104 |
| 2010/0023940 A1 * | 1/2010 | Iwamatsu | ............. | G06F 1/3203 718/1 |
| 2010/0313200 A1 * | 12/2010 | Rozee | ...................... | G06F 8/61 718/1 |
| 2010/0325191 A1 * | 12/2010 | Jung | ...................... | G06F 15/16 709/202 |
| 2011/0145616 A1 * | 6/2011 | Rychlik et al. | ............... | 713/323 |
| 2011/0161695 A1 * | 6/2011 | Okita | .................... | G06F 1/3209 713/310 |
| 2012/0005344 A1 * | 1/2012 | Kolin | .................. | H05K 7/20836 709/226 |
| 2012/0204051 A1 * | 8/2012 | Murakami | ........... | G06F 9/5088 713/324 |
| 2012/0233607 A1 * | 9/2012 | Kuroda | ................. | G06F 9/5077 718/1 |
| 2012/0311576 A1 * | 12/2012 | Shu | ..................... | G06F 9/45558 718/1 |
| 2013/0227562 A1 * | 8/2013 | Tsirkin et al. | .................... | 718/1 |

* cited by examiner

*Primary Examiner* — Jaweed A Abbaszadeh
*Assistant Examiner* — Keshab Pandey (57) ABSTRACT

Systems, methods, and software are described herein for operating a power management system including identifying a virtual machine load in a virtual machine environment, identifying a power state for at least one real machine in the virtual machine environment based on the virtual machine load, and modifying the power state for the at least one real machine.

18 Claims, 6 Drawing Sheets

SYSTEMS AND METHODS FOR MODIFYING POWER STATES IN A VIRTUAL ENVIRONMENT

TECHNICAL BACKGROUND

A "virtual machine" is a virtualized copy of a computer system, with virtual hardware (including disk controller, network card, etc.). Frequently, running within the virtual machine is a full operating system. These virtual machines run on a physical host server known as a hypervisor. The hypervisor abstracts the physical hardware of the host server so that the virtual machine sees virtual hardware regardless of what the underlying hardware includes. The storage volumes that appear within the virtual machine are virtualized storage volumes provided by the hypervisor. The storage volumes visible from within the virtual machine can come from multiple sources.

Virtual machines are often started and stopped in response to a needed workload. Thus, during some periods, a minimum number of virtual machines are required, whereas other periods, a maximum number of virtual machines are required. These changes in the needs for virtual machines can create power inefficiencies in the real computer systems that operate the virtual machines.

For virtual desktops provided by a connection broker, such as VMware View or Citrix XenDesktop, one user will be assigned an available virtual machine at logon time out of a desktop pool. The number of users logging into virtual desktops (and therefore the number of virtual machines in use) follows typical work patterns—high demand starting in the morning and continuing through the day until the evening when workers end their workday.

Virtual desktop brokering products, such as Citrix XenDesktop, will automatically start new virtual machines as the reserve of virtual machines available for future users falls below a threshold. However, these products are designed to distribute the load of new virtual machines equally across all the hypervisors. This can result in an inefficient distribution where 4 hypervisors (each capable of serving 100 virtual desktops) end up with only 25 virtual desktops.

OVERVIEW

In some examples, a method of real machine power state management includes identifying a virtual machine load, identifying a power state for at least one real machine based on the virtual machine load, and modifying the power state for the at least one real machine.

In some examples, a computer-readable medium having program instructions stored thereon that, when executed by a computing system, direct the computing system to identify a virtual machine load, identify a power state for at least one real machine based on the virtual machine load, and modify the power state for the at least one real machine.

In some examples, a power management system includes a load component configured to identify a virtual machine load, a power state identifier component configured to identify a power state for at least one real machine based on the virtual machine load, and a power state modifier component configured to modify the power state for the at least one real machine.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
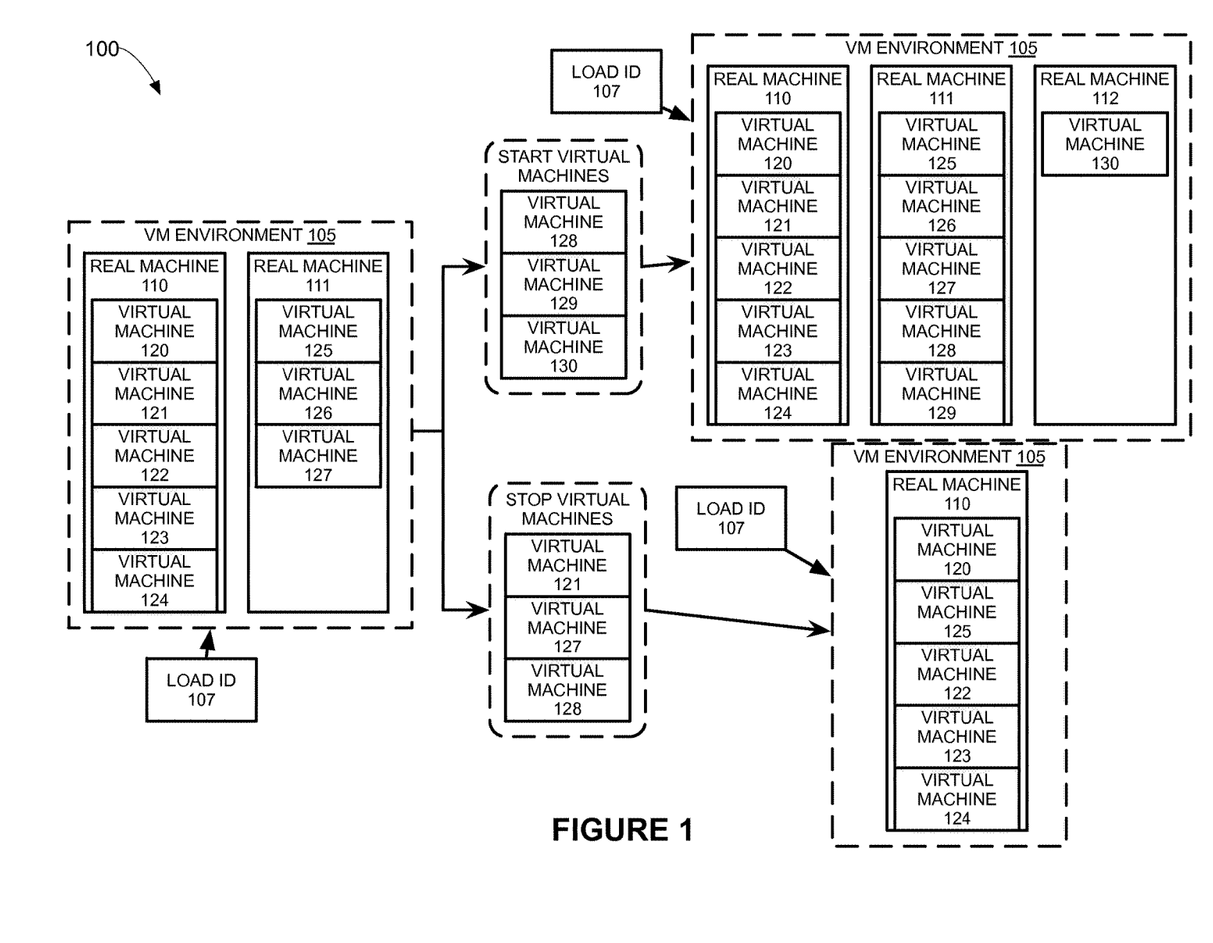
FIG. 1 illustrates a load identifier environment according to one example.

FIG. 1 illustrates a load identifier environment 100 according to one example. Load identifier environment 100 includes virtual machine environment 105 and load identifier 107. Virtual machine environment 105 includes real machines 110-112 and virtual machines 120-130.

Real machines 110-112 can include any computer or processing system capable of executing a virtual machine. Real machines 110-112 can include server computers, desktop computers, or any other system capable of executing a virtual machine—including combinations thereof. Real machines 110-112 can execute a hypervisor to operate virtual machines 120-130. In this example, three real machines are shown for simplicity, but those skilled in the art will appreciate that any number of real machines may be included in virtual machine environment 105.

Virtual machines 120-130 can be virtualized copies of computer systems, including virtualized copies of real machines 110-112. In some examples, executing within virtual machines 120-130 is a full operating system. Virtual machines 120-130 can execute on a hypervisor, which abstracts the physical hardware of real machines 110-112 so that virtual machines 120-130 see virtual hardware regardless of what the underlying hardware includes. The storage volumes that appear within the virtual machine are virtualized storage volumes provided by the hypervisor. The storage volumes visible from within the virtual machine can come from multiple sources.

Load identifier 107 can include any device capable of identifying and modifying real machine power states based on a virtual machine load in virtual machine environment 105. Load identifier 107 can include server computers, desktop computers, laptop computers, or any other programmable circuitry capable of identifying and modifying real machine power states based on the virtual machine load—including combinations thereof. Although shown separately, it should be understood that load identifier 107 can reside in whole or in part on any real machine 110-112. A virtual machine load is the amount of load that the virtual machines are putting on the real machines. In the present example, each of the real machines is capable of operating five virtual machines at any given time. Thus, load identifier 107 can be capable of determining if a real machine is at maximum capacity or if there is processing space for another virtual machine.

In operation, virtual machines can be either started (path 140) or stopped (path 150) in virtual machine environment 105. As illustrated by path 140, when virtual machines are added to the environment, real machines can change their power state to become available to operate the virtual machines. Path 140 illustrates that when virtual machines 128-130 are added to virtual machine environment 105, a new real machine 112 becomes available to accommodate the increased virtual machine load. This new machine 112 can be turned on, woken from sleep, or otherwise made available by load identifier 107 in response to the virtual machine load.

Alternatively, path 150 illustrates when virtual machines are stopped in virtual machine environment 105. As illustrated in path 150, virtual machines 121, 127, 128 are stopped in virtual machine environment 105. Thus, based on the virtual machine load, real machine 111 is no longer needed and the remaining virtual machines can be consolidated to a single virtual machine 110.

Figure 2:
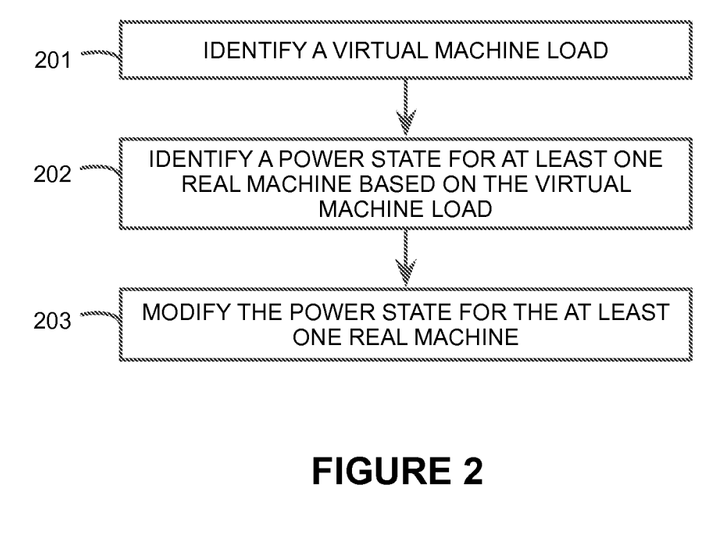
FIG. 2 illustrates the operation of a load identifier according to one example.

FIG. 2 illustrates the operation of load identifier 107 according to one example. Load identifier 107 identifies a virtual machine load for virtual machine environment 105 (step 201). This virtual machine load can include the amount of virtual machines currently executing within virtual machine environment 105 and the new virtual machines that need to be added to virtual machine environment 105. Based on the assessment of the virtual machine load, load identifier 107 identifies a power state for at least one real machine 110-112 based on the virtual machine load (step 202). The identification of the power state may include whether real machine 110-112 should be turned on, turned off, put to sleep, wake, or any other similar power function—including combinations thereof. Once the power state has be identified, load identifier 107 then modifies the power state of the at least one virtual machine 110-112 according to the identified power state from step 202 (step 203).

Figure 3:
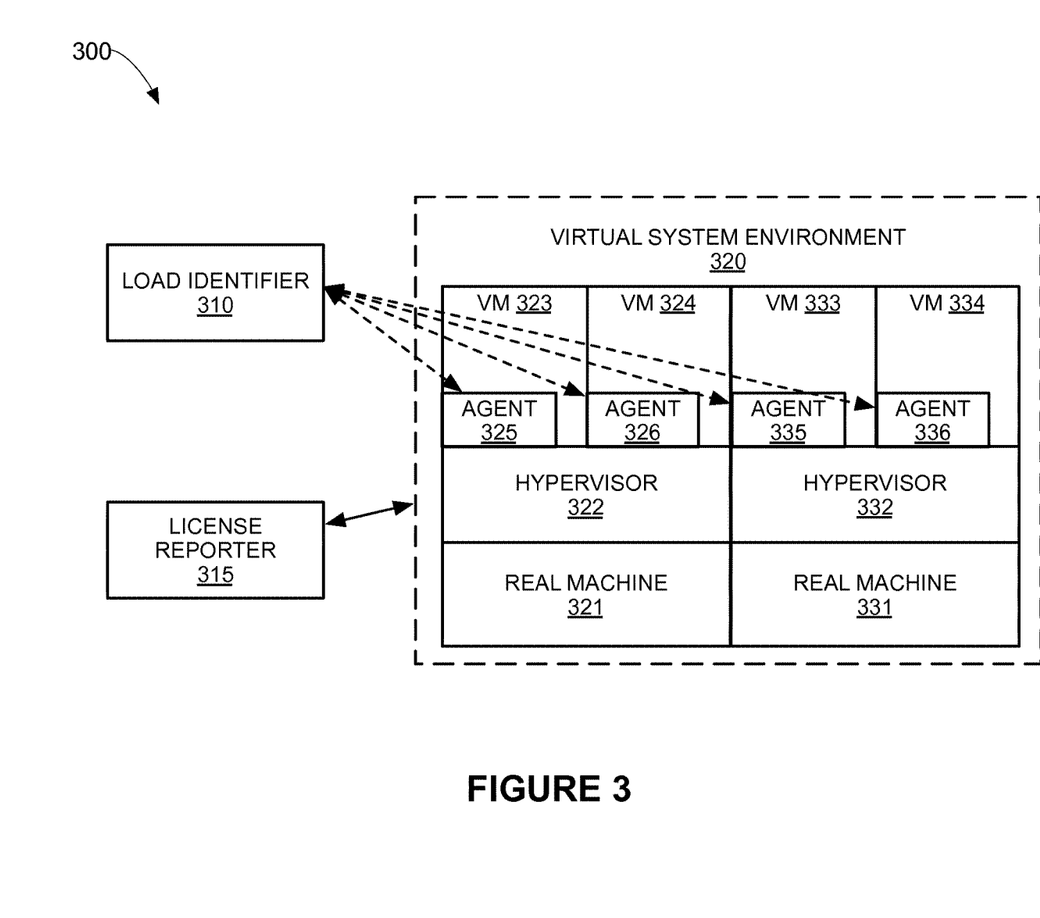
FIG. 3 illustrates a load identifier environment according to one example.

FIG. 3 illustrates a load identifier environment 300 according to one example. Load identifier environment 300 includes load identifier 310, license reporter 315, and virtual system environment 320. Virtual system environment 320 includes real machines 321, 331, hypervisors 322, 332, virtual machines 323, 324, 333, 334, and virtual machine agents 325, 326, 335, 336.

Real machines 321, 331 may be any computer system, custom hardware, or other device configured to operate as a host machine. In this example, two host machines are shown for simplicity, but those skilled in the art will appreciate that any number of host machines may be included in virtual system environment 320.

Running on real machines 321, 331 are hypervisors 322, 332. Hypervisors 322, 332 allow multiple operating systems (guest operating systems) to run concurrently on real machines 321, 331 (i.e., the host machines). Although not shown for simplicity, each hypervisor can further communicate with, or include, a virtual machine manager that manages the virtual machines and the storage volumes attached to the virtual machines. In this example a single hypervisor is shown on each real machine for simplicity. Those skilled in the art will appreciate that more hypervisors may be present on each real machine.

In this example, hypervisor 322 includes virtual machine 323 and virtual machine 324, and hypervisor 332 includes virtual machine 333 and virtual machine 334. Those skilled in the art will appreciate that more or fewer virtual machines may be present on each hypervisor. As shown, each virtual machine contains a virtual machine agent 325, 326, 335, 336. A virtual machine agent may be configured to determine which storage volumes to attach to the virtual machine and/or may be configured to communicate with the hypervisor (or virtual machine manager).

Load identifier 310 can include one or more computer systems, custom hardware, or other devices configured to identify the virtual machine load and modify the power state of the real machines. In this example, load identifier 310 is shown separate from virtual system environment 320, but those skilled in the art will appreciate that load identifier 310 could reside entirely or partially on real machines within virtual system environment 320.

License reporter 315 can include one or more computer systems, custom hardware, or other devices configured to manage the operating system and software licenses for the virtual machines in virtual system environment 320. In this example, license report is shown separate from virtual system environment 320, but those skilled in the art will appreciate that license reporter 315 could reside entirely or partially on real machines within virtual system environment 320.

In operation, load identifier 310 will identify the virtual machine load within virtual system environment 320. The virtual machine load can consist of the number of virtual machines currently executing within virtual system environment 320, and the number of virtual machines to be started in virtual system environment 320.

In the present example, to identify the virtual machine load, load identifier 310 inquires or polls the virtual machine agents to identify the virtual machines that are executing in virtual system environment 320. The polling of the agents can occur continuously, can occur at set intervals, can occur at predetermined times, or any other method of polling. In at least one example, load identifier 310 can further identify the number of virtual machines that need to be started in virtual system environment 320.

Based on the virtual machine load, load identifier 310 identifies a proper power state for one or more of the real machines within virtual system environment 320. If the virtual machine load can execute on fewer real machines or more real machines are needed to accommodate the virtual machine load, load identifier 310 identifies the real machines that can change power states. For example, if after polling a real machine no longer has any virtual machines, load identifier 310 can identify that the real machine can be put to sleep, can turn off the real machine, or any other power saving option on the real machine. In another example, if after polling load identifier 310 identifies that the virtual machines can be consolidated onto fewer real machines, load identifier 310 can consolidate the virtual machines to fewer real machines and, subsequently, perform a power saving option on the real machines without virtual machines.

Conversely, if load identifier 310 identifies that one or more additional real machines are needed based on the virtual machine load, load identifier 310 can turn on one or more real machines, can take one or more real machines out of sleep, or can otherwise make one or more real machines available to execute virtual machines.

Once the power state is determined for the one or more real machines, load identifier then modifies the power state of these one or more real machines.

Figure 4:
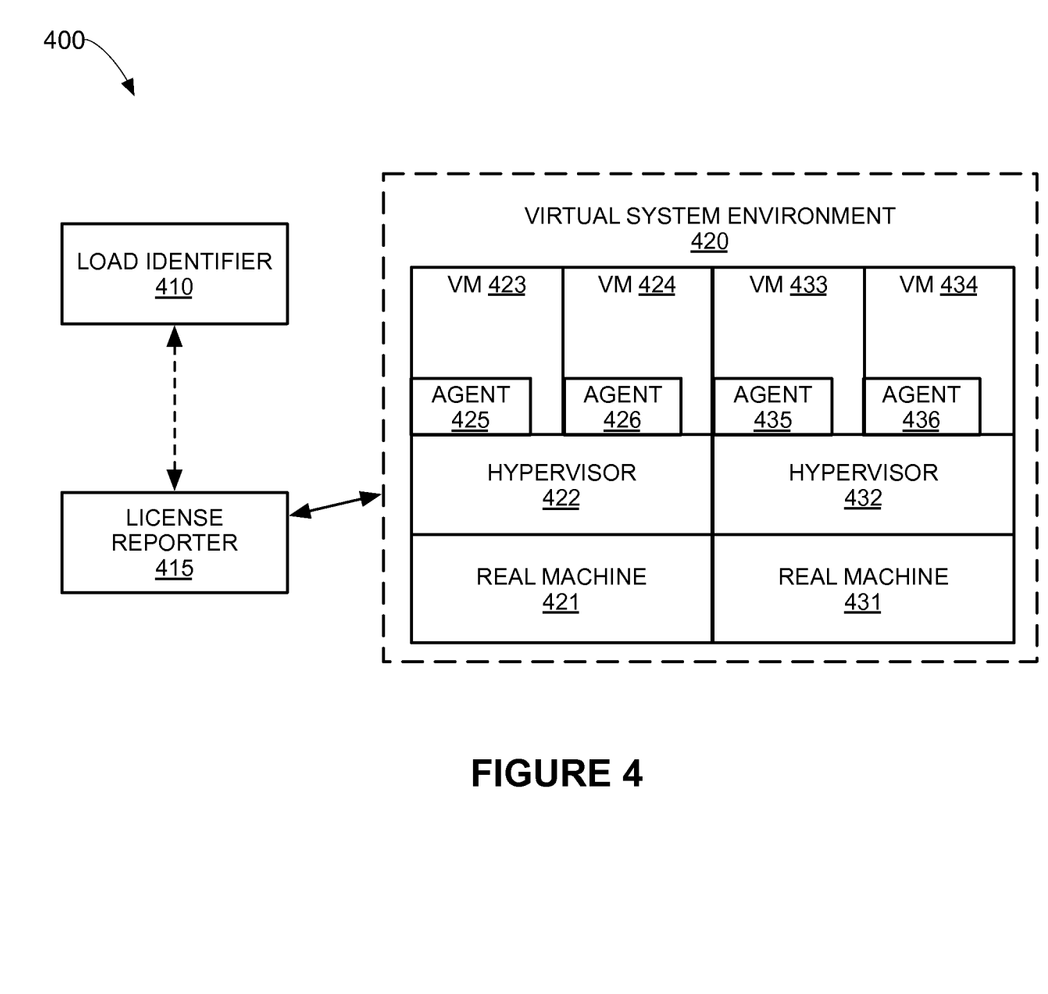
FIG. 4 illustrates a load identifier environment according to one example.

FIG. 4 illustrates a load identifier environment 400 according to one example. Load identifier environment 400 includes load identifier 410, license reporter 415, and virtual system environment 420. Virtual system environment 420 includes real machines 421, 431, hypervisors 422, 432, virtual machines 423, 424, 433, 434, and virtual machine agents 425, 426, 435, 436.

Real machines 421, 431 may be any computer system, custom hardware, or other device configured to operate as a host machine. In this example, two host machines are shown for simplicity, but those skilled in the art will appreciate that any number of host machines may be included in virtual system environment 420.

Running on real machines 421, 431 are hypervisors 422, 432. Hypervisors 422, 432 allow multiple operating systems (guest operating systems) to run concurrently on real machines 421, 431 (i.e., the host machines). Although not shown for simplicity, each hypervisor can further communicate with, or include, a virtual machine manager that manages the virtual machines and the storage volumes attached to the virtual machines. In this example a single hypervisor is shown on each real machine for simplicity. Those skilled in the art will appreciate that more hypervisors may be present on each real machine.

In this example, hypervisor 422 includes virtual machine 423 and virtual machine 424, and hypervisor 432 includes virtual machine 433 and virtual machine 434. Those skilled in the art will appreciate that more or fewer virtual machines may be present on each hypervisor. As shown, each virtual machine contains a virtual machine agent 425, 426, 435, 436. A virtual machine agent is configured to determine which storage volumes to attach to the virtual machine and can also be configured to communicate with the hypervisor (or virtual machine manager). The virtual machine agents may be omitted in some examples.

Load identifier 410 can include one or more computer systems, custom hardware, or other devices configured to identify the virtual machine load and modify the power state of the real machines. In this example, load identifier 410 is shown separate from virtual system environment 420, but those skilled in the art will appreciate that load identifier 410 could reside entirely or partially on real machines within virtual system environment 420.

License reporter 415 can include one or more computer systems, custom hardware, or other devices configured to manage the operating system and software licenses for the virtual machines in virtual system environment 420. In this example, license report is shown separate from virtual system environment 420, but those skilled in the art will appreciate that license reporter 415 could reside entirely or partially on real machines within virtual system environment 420.

In operation, load identifier 410 will identify the virtual machine load within virtual system environment 420. The virtual machine load can consist of the number of virtual machines currently executing within virtual system environment 420, and the number of virtual machines to be started in virtual system environment 420.

In the present example, to identify the virtual machine load, load identifier 410 inquires or polls license reporter 415. License reporter 415 can report identities of virtual machines operating, as well as information about the real machines the virtual machines are operating on (such as the identity of the real machine). The inquiring of license reporter 415 can occur continuously, can occur at set intervals, can occur at predetermined times, or any other method of polling. In at least one example, load identifier 410 can further identify the number of virtual machines that need to be started in virtual system environment 420.

Based on the virtual machine load, load identifier 410 identifies a proper power state for one or more of the real machines within virtual system environment 420. If the virtual machine load can execute on fewer real machines or more real machines are needed to accommodate the virtual machine load, load identifier 410 identifies the real machines that can change power states. For example, if after polling a real machine no longer has any virtual machines, load identifier 410 can identify that the real machine can be put to sleep, that the real machine can be turned off, or any other power saving option on the real machine. In another example, if after polling load identifier 410 identifies that the virtual machines can be consolidated onto fewer real machines, load identifier 410 can consolidate the virtual machines to fewer real machines and, subsequently, perform a power saving option on the real machines without virtual machines.

Conversely, if load identifier 410 identifies that one or more additional real machines are needed based on the virtual machine load, load identifier 410 can turn on one or more real machines, can take one or more real machines out of sleep, or can otherwise make one or more real machines available to execute virtual machines.

Once the power state is identified for the one or more real machines, load identifier then modifies the power state of these one or more real machines based on the identified power state.

Figure 5:
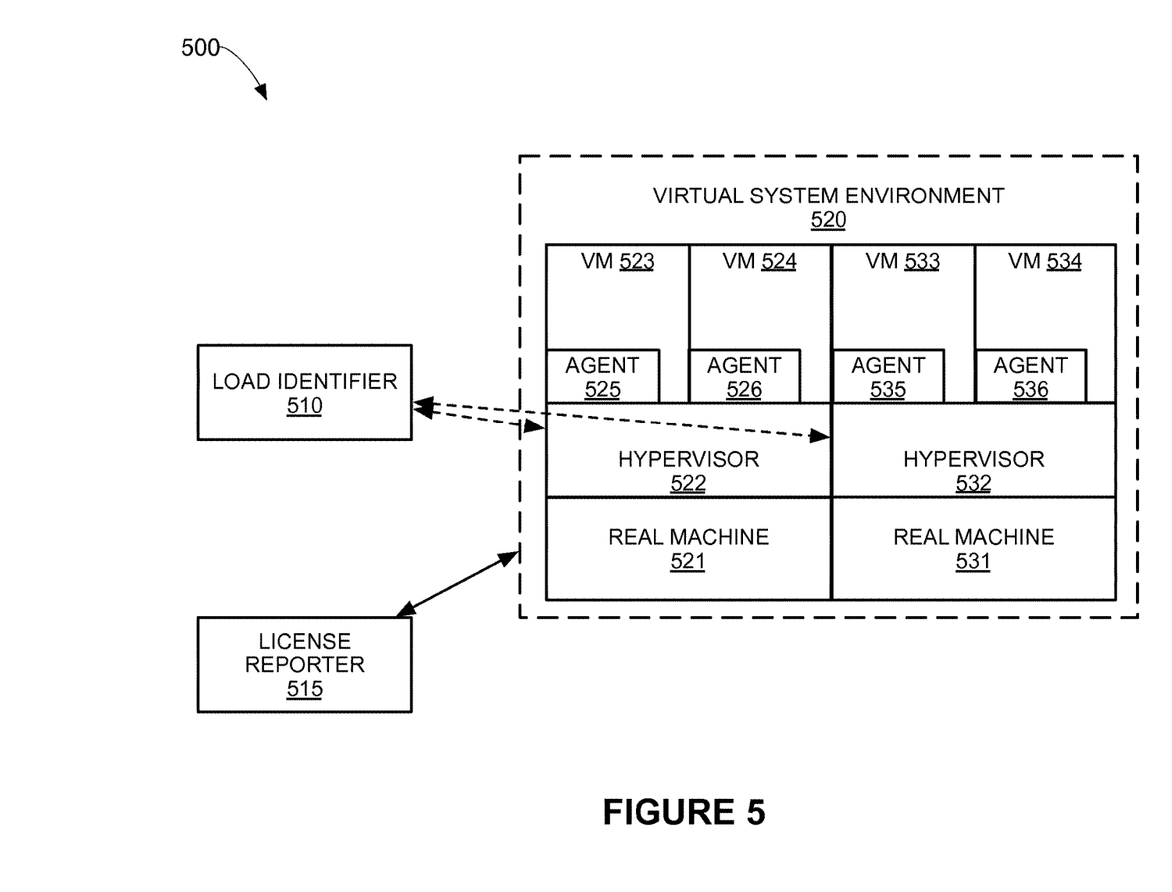
FIG. 5 illustrates a load identifier environment according to one example.

FIG. 5 illustrates a load identifier environment 500 according to one example. Load identifier environment 500 includes load identifier 510, license reporter 515, and virtual system environment 520. Virtual system environment 520 includes real machines 521, 531, hypervisors 522, 532, virtual machines 523, 524, 533, 534, and virtual machine agents 525, 526, 535, 536.

Real machines 521, 531 may be any computer system, custom hardware, or other device configured to operate as a host machine. In this example, two host machines are shown for simplicity, but those skilled in the art will appreciate that any number of host machines may be included in virtual system environment 520.

Running on real machines 521, 531 are hypervisors 522, 532. Hypervisors 522, 532 allow multiple operating systems (guest operating systems) to run concurrently on real machines 521, 531 (i.e., the host machines). Although not shown for simplicity, each hypervisor can further communicate with, or include, a virtual machine manager that manages the virtual machines and the storage volumes attached to the virtual machines. In this example a single hypervisor is shown on each real machine for simplicity. Those skilled in the art will appreciate that more hypervisors may be present on each real machine.

In this example, hypervisor 522 includes virtual machine 523 and virtual machine 524, and hypervisor 532 includes virtual machine 533 and virtual machine 534. Those skilled in the art will appreciate that more or fewer virtual machines may be present on each hypervisor. As shown, each virtual machine contains a virtual machine agent 525, 526, 535, 536. A virtual machine agent is configured to determine which storage volumes to attach to the virtual machine and can also be configured to communicate with the hypervisor (or in some cases a virtual machine manager that interacts with the hypervisor). The virtual machine agents may be omitted in some examples.

Load identifier 510 can include one or more computer systems, custom hardware, or other devices configured to identify the virtual machine load and modify the power state of the real machines. In this example, load identifier 510 is shown separate from virtual system environment 520, but those skilled in the art will appreciate that load identifier 510 could reside entirely or partially on real machines within virtual system environment 520.

License reporter 515 can include one or more computer systems, custom hardware, or other devices configured to manage the operating system and software licenses for the virtual machines in virtual system environment 520. In this example, license report is shown separate from virtual system environment 520, but those skilled in the art will appreciate that license reporter 515 could reside entirely or partially on real machines within virtual system environment 520.

In operation, load identifier 510 will identify the virtual machine load within virtual system environment 520. The virtual machine load can consist of the number of virtual machines currently executing within virtual system environment 520, and the number of virtual machines to be started in virtual system environment 520.

In the present example, to identify the virtual machine load, load identifier 510 polls hypervisors 522, 532 to determine the number of virtual machines operating on the hypervisors. In some examples, if a virtual machine manager is included, the virtual machine manager may be polled instead of the hypervisor. The polling of the hypervisors can occur continuously, can occur at set intervals, can occur at predetermined times, or any other method of polling. In at least one example, load identifier 510 can further identify virtual machines that need to be started in virtual system environment 520.

In another example, rather than polling the hypervisors, the hypervisors can be configured to communicate with load identifier 510 when a virtual machine is stopped. For example, if virtual machine 523 was stopped, hypervisor 522 could report the virtual machine stop to load identifier 510. Alternatively, in some examples, rather than the hypervisor reporting a virtual machine stop, a virtual machine manager could report the virtual machine stop.

Based on the virtual machine load, load identifier 510 identifies a proper power state for one or more of the real machines within virtual system environment 520. If the virtual machine load can execute on fewer real machines or more real machines are needed to accommodate the virtual machine load, load identifier 510 identifies the real machines that can change power states. For example, if after polling a real machine no longer has any virtual machines, load identifier 510 can identify that the real machine can be put to sleep, that the real machine can be turned off, or any other power saving option on the real machine. In another example, if after polling load identifier 510 identifies that the virtual machines can be consolidated onto fewer real machines, load identifier 510 can consolidate the virtual machines to fewer real machines and, subsequently, perform a power saving option on the real machines without the virtual machines.

Conversely, if load identifier 510 identifies that one or more additional real machines are needed based on the virtual machine load, load identifier 510 can turn on one or more real machines, can take one or more real machines out of sleep, or can otherwise make one or more real machines available to execute virtual machines.

Once the power state is identified for the one or more real machines, load identifier then modifies the power state of these one or more real machines based on the identified power state.

Figure 6:
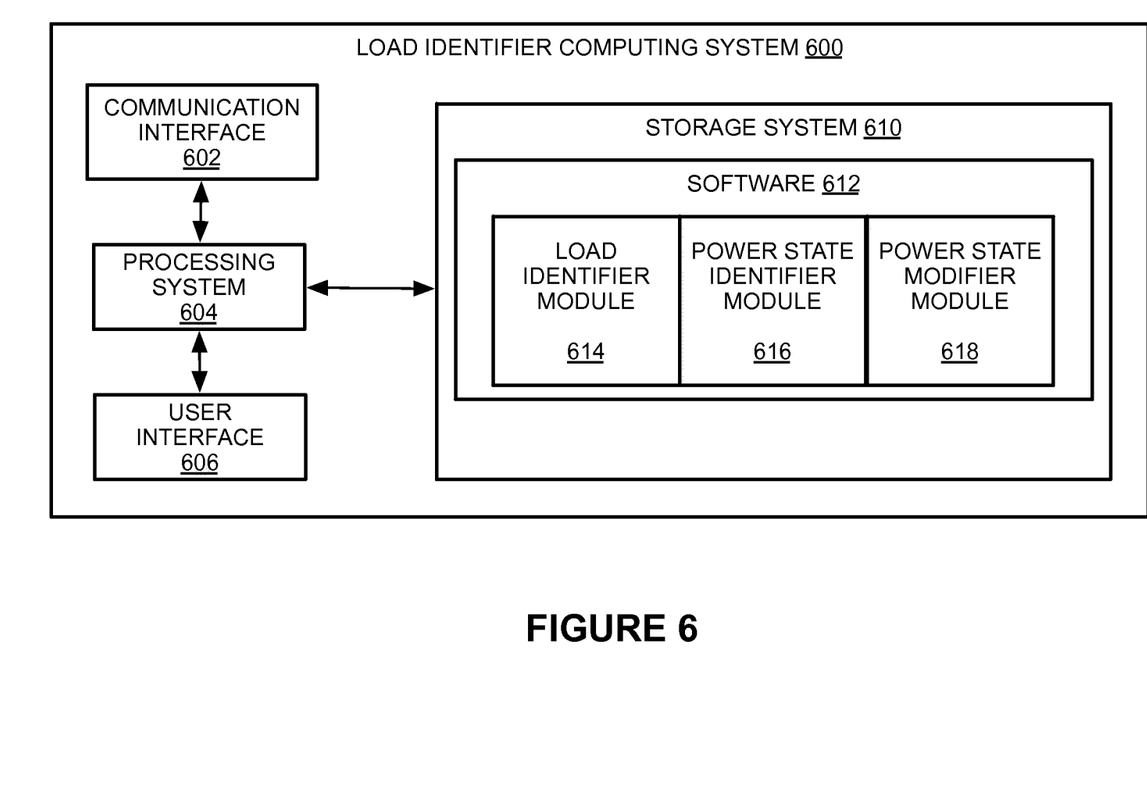
FIG. 6 illustrates a load identifier computing system according to one example.

FIG. 6 illustrates load identifier computing system 600. Load identifier computing system 600 includes processing system 604, storage system 610, software 612, communication interface 602, and user interface 606. Processing system 604 loads and executes software 612 from storage system 610. Software 612 includes load identifier module 614, power state identifier module 616, and power state modifier module 618. Software 612 may further include an operating system, utilities, drivers, network interfaces, applications, or some other type of software. When executed by computing system 600, software modules 614-618 direct processing system 604 to operate as described herein.

In particular, in at least one example, load identifier module 614 directs processing system 604 to identify a virtual machine load, power state identifier module 616 directs processing system 604 to identify a power state for at least one real machine based on the virtual machine load, and power state modifier module 618 directs processing system 604 to modify the power state for the at least one real machine.

Although computing system 600 includes three software modules in the present example, it should be understood that any number of modules could provide the same operation.

Additionally, computing system 600 includes communication interface 602 that can be configured to communicate with real machines to identify a virtual machine load and to modify the real machine power states. Communication network 602 can include the Internet or any other form of communication network.

Referring still to FIG. 6, processing system 604 can comprise a microprocessor and other circuitry that retrieves and executes software 612 from storage system 610. Processing system 604 can be implemented within a single processing device but can also be distributed across multiple processing devices or sub-systems that cooperate in executing program instructions. Examples of processing system 604 include general-purpose central processing units, application specific processors, and logic devices, as well as any other type of processing device, combinations of processing devices, or variations thereof.

Storage system 610 can comprise any storage media readable by processing system 604, and capable of storing software 612. Storage system 610 can include volatile and nonvolatile, removable and non-removable media implemented in any method or technology for storage of information, such as computer readable instructions, data structures, program modules, or other data. Storage system 610 can be implemented as a single storage device but may also be implemented across multiple storage devices or sub-systems. Storage system 610 can comprise additional elements, such as a controller, capable of communicating with processing system 604.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 606 can include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 606. The aforementioned user input and output devices are well known in the art and need not be discussed at length here. In some examples, user interface 606 can be omitted.

It should be understood that although computing system 600 is shown as one system, the system can comprise one or more systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   identifying a virtual machine load for a plurality of computers based at least on polling hypervisors executing on the plurality of computers, wherein each computer in the plurality of computers executes at least one hypervisor, and wherein the virtual machine load for the plurality of computers comprises a quantity of virtual machines executing on the plurality of computers and a quantity of virtual machines waiting to be started on the plurality of computers;
   identifying at least one virtual machine that can be consolidated from at least one computer to one or more other computers in the plurality of computers based on the virtual machine load;
   identifying a modified power state for the at least one computer in the plurality of computers;
   migrating the at least one virtual machine to the one or more other computers; and
   in response migrating the at least one virtual machine, changing a current power state for the at least one computer to the modified power state for the at least one computer, wherein the modified power state comprises a power saving state over the current power state.

2. The method of claim 1 wherein identifying the at least one virtual machine that can be consolidated from the at least one computer to the one or more other computers in the plurality of computers comprises identifying the at least one virtual machine that can be consolidated from the at least one computer to the one or more other computers, wherein the one or more other computers have capacity to process the at least one virtual machine.

3. The method of claim 1 further comprising identifying at least one secondary computer in the plurality of computers without any executing virtual machines, identifying a second modified power state for the at least one secondary computer, and changing a current power state for the at least one secondary computer to the second modified power state for the at least one secondary computer, wherein the second modified power state comprises a power saving state over the current power state for the at least one secondary computer.

4. The method of claim 3 wherein changing the current power state for the at least one secondary computer to the second modified power state for the at least one secondary computer comprises one of:

changing the at least one secondary computer from a powered on state to a powered off state; or
changing the at least one secondary computer from an awake state to a sleep state.

5. The method of claim 1 wherein the current power state comprises a powered on state and the modified power state comprises a powered off state.

6. The method of claim 1 wherein the current power state comprises an awake state and the modified power state comprises a sleep state.

7. A non-transitory computer-readable medium having program instruction stored thereon that, when executed by a computing system, direct the computing system to at least:
   identify a virtual machine load for a plurality of computers based at least on polling hypervisors executing on the plurality of computers, wherein each computer in the plurality of computers executes at least one hypervisor, and wherein the virtual machine load for the plurality of computers comprises a quantity of virtual machines executing on the plurality of computers and a quantity of virtual machines waiting to be started on the plurality of computers;
   identify at least one virtual machine that can be consolidated from at least one computer to one or more other computers in the plurality of computers based on the virtual machine load;
   identify a modified power state for the at least one computer in the plurality of computers;
   migrate the at least one virtual machine to the one or more other computers; and
   in response to migrating the at least one virtual machine, change a current power state for the at least one computer to the modified power state for the at least one computer, wherein the modified power state comprises a power saving state over the current power state.

8. The non-transitory computer-readable medium of claim 7 wherein the program instructions, to direct the computing system to identify the at least one virtual machine that can be consolidated from the at least one computer to the one or more other computers, direct the computing system to identify the at least one virtual machine that can be consolidated from the at least one computer to the one or more other computers, wherein the one or more other computers have capacity to process the at least one virtual machine.

9. The non-transitory computer-readable medium of claim 7 wherein the program instructions further direct the computing system to identify at least one secondary computer in the plurality of computers without any executing virtual machines, identify a second modified power state for the at least one secondary computer, and change a current power state for the at least one secondary computer to the second modified power state for the at least one secondary computer, wherein the second modified power state comprises a power saving state over the current power state for the at least one secondary computer.

10. The non-transitory computer-readable medium of claim 9 wherein the program instructions, to direct the computing system to change the current power state for the at least one secondary computer to the second modified power state for the at least one secondary computer, direct the computing system to:
    change the at least one secondary computer from a powered on state to a powered off state; or
    change the at least one secondary computer from an awake state to a sleep state.

11. The non-transitory computer-readable medium of claim 7 wherein the current power state comprises a powered on state and the modified power state comprises a powered off state.

12. The non-transitory computer-readable medium of claim 7 wherein the current power state comprises an awake state and the modified power state comprises a sleep state.

13. A power management system comprising:
one or more non-transitory computer readable storage media;
a processing system operatively coupled to the one or more non-transitory computer readable storage media; and
program instructions stored on the one or more non-transitory computer readable storage media that, when read and executed by the processing system, direct the processing system to at least:
identify a virtual machine load for a plurality of computers based at least on polling hypervisors executing on the plurality of computers, wherein each computer in the plurality of computers executes at least one hypervisor, and wherein the virtual machine load for the plurality of computers comprises a quantity of virtual machines executing on the plurality of computers and a quantity of virtual machines waiting to be started on the plurality of computers;
identify at least one virtual machine that can be consolidated from at least one computer to one or more other computers in the plurality of computers based on the virtual machine load, and identify a modified power state for the at least one computer in the plurality of computers; and
migrate the at least one virtual machine to the one or more other computers and, in response to migrating the at least one virtual machine, change a current power state for the at least one computer to the modified power state for the at least one computer, wherein the modified power state comprises a power saving state over the current power state.

14. The system of claim 13 wherein the current power state comprises a powered on state and the modified power state comprises a powered off state.

15. The system of claim 13 wherein the current power state comprises an awake state and the modified power state comprises a sleep state.

16. The system of claim 13 wherein identifying the at least one virtual machine that can be consolidated from the at least one computer to the one or more other computers in the plurality of computers comprises identifying the at least one virtual machine that can be consolidated from the at least one computer to the one or more other computers, wherein the one or more other computers have capacity to process the at least one virtual machine.

17. The system of claim 13 wherein the program instructions further direct the processing system to identify at least one secondary computer in the plurality of computers without any executing virtual machines, identify a second modified power state for the at least one secondary computer, and change a current power state for the at least one secondary computer to the second modified power state for the at least one secondary computer, wherein the second modified power state comprises a power saving state over the current power state for the at least one secondary computer.

18. The system of claim 17 wherein changing the current power state for the at least one secondary computer to the second modified power state for the at least one secondary computer comprises:
changing the at least one secondary computer from a powered on state to a powered off state: or
changing the at least one secondary computer from an awake state to a sleep state.

* * * * *